(12) United States Patent
Song

(10) Patent No.: US 11,003,590 B2
(45) Date of Patent: May 11, 2021

(54) MEMORY SYSTEM AND OPERATING METHOD THEREOF

(71) Applicant: SK hynix Inc., Gyeonggi-do (KR)

(72) Inventor: Min-O Song, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 49 days.

(21) Appl. No.: 16/425,451

(22) Filed: May 29, 2019

(65) Prior Publication Data

US 2020/0133882 A1 Apr. 30, 2020

(30) Foreign Application Priority Data

Oct. 24, 2018 (KR) .......................... 10-2018-0127720

(51) Int. Cl.
*G06F 12/12* (2016.01)
*G06F 3/06* (2006.01)
*G06F 12/0882* (2016.01)

(52) U.S. Cl.
CPC ............ *G06F 12/12* (2013.01); *G06F 3/0605* (2013.01); *G06F 3/0656* (2013.01); *G06F 3/0679* (2013.01); *G06F 12/0882* (2013.01)

(58) Field of Classification Search
None
See application file for complete search history.

(56) References Cited

U.S. PATENT DOCUMENTS

| 7,975,109 | B2 * | 7/2011 | McWilliams | ....... G06F 12/0802 711/147 |
| 9,753,939 | B2 | 9/2017 | Shu et al. | |
| 10,740,241 | B2 * | 8/2020 | Jia | ........................ G06F 12/0804 |
| 2008/0140724 | A1 * | 6/2008 | Flynn | ................... G06F 12/0804 |
| 2012/0198174 | A1 * | 8/2012 | Nellans | .................. G06F 3/0655 711/133 |
| 2012/0284544 | A1 * | 11/2012 | Xian | ........................ G06F 3/061 713/320 |
| 2015/0262712 | A1 * | 9/2015 | Chen | ....................... G11C 29/42 714/723 |
| 2016/0062913 | A1 * | 3/2016 | Woo | ...................... G06F 12/0893 711/105 |

(Continued)

FOREIGN PATENT DOCUMENTS

| EP | 2420933 A1 * | 2/2012 | ......... G06F 12/0895 |
| WO | WO-2012024158 A1 * | 2/2012 | ......... G06F 12/0897 |

*Primary Examiner* — Charles Rones
*Assistant Examiner* — Ryan Dare
(74) *Attorney, Agent, or Firm* — IP & T Group LLP

(57) ABSTRACT

A memory system includes: a memory device storing host data provided from a host; and a memory controller managing and transferring the host data between the host and the memory device, wherein the memory controller comprises: a write buffer temporarily storing the host data to be transferred to the memory device; a buffer monitoring device checking a usage amount of the write buffer during a predetermined period; a buffer usage comparing device generating a flush control signal based on a usage amount comparison result by comparing the usage amount checked during a current period corresponding to the predetermined period with the usage amount checked during a previous period corresponding to the predetermined period; and a first flush device transferring the host data temporarily stored in the write buffer to the memory device in response to the flush control signal.

18 Claims, 12 Drawing Sheets

(56) References Cited

U.S. PATENT DOCUMENTS

| | | | |
|---|---|---|---|
| 2017/0075593 A1* | 3/2017 | Kim | G06F 3/0616 |
| 2017/0154656 A1* | 6/2017 | Yeh | G11C 11/5628 |
| 2017/0177235 A1* | 6/2017 | Nishikubo | G06F 3/0656 |
| 2018/0181186 A1* | 6/2018 | Diefenbaugh | G06F 3/0634 |

* cited by examiner

MEMORY SYSTEM AND OPERATING METHOD THEREOF

CROSS-REFERENCE TO RELATED APPLICATIONS

The present application claims priority under 35 U.S.C. § 119(a) to Korean Patent Application No. 10-2018-0127720, filed on Oct. 24, 2018, which is incorporated herein by reference in its entirety.

BACKGROUND

1. Field

Exemplary embodiments of the present invention relate to a memory system, and more particularly, to a memory system capable of efficiently performing a flush operation, and a method for operating the memory system.

2. Description of the Related Art

The computer environment paradigm has shifted to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts, as compared with a hard disk device. Examples of memory systems having such advantages include universal serial bus (USB) memory devices, memory cards having various interfaces, and solid state drives (SSDs).

SUMMARY

Embodiments of the present invention are directed to a memory system capable of efficiently performing a flush operation.

In accordance with an embodiment of the present invention, a memory device includes: a memory device suitable for storing host data provided from a host; and a memory controller suitable for managing and transferring the host data between the host and the memory device, wherein the memory controller comprises: a write buffer suitable for temporarily storing the host data to be transferred to the memory device; a buffer monitoring device suitable for checking a usage amount of the write buffer during a predetermined period; a buffer usage comparing device suitable for generating a flush control signal based on a usage amount comparison result by comparing the usage amount checked during a current period corresponding to the predetermined period with the usage amount checked during a previous period corresponding to the predetermined period; and a first flush device suitable for transferring the host data temporarily stored in the write buffer to the memory device in response to the flush control signal.

In accordance with another embodiment of the present invention, a method for operating a memory system includes: buffering host data provided from a host in a write buffer; checking a usage amount of the write buffer during a predetermined period; generating a flush control signal based on a usage amount comparison result by comparing the usage amount checked during a current period corresponding to the predetermined period with the usage amount checked during a previous period corresponding to the predetermined period; and performing a first flush operation of transferring the host data temporarily stored in the write buffer to a memory device in response to the flush control signal.

In accordance with another embodiment of the present invention, a memory device includes: a memory device; a buffer suitable for buffering external data; and a controller suitable for controlling the memory device to periodically perform an internal flush operation of flushing the buffered data therein, wherein the controller further controls the memory device to skip the internal flush operation of a current period when difference among sizes of the buffered data of last two or more periods varies within a threshold.

DETAILED DESCRIPTION

Figure 1:
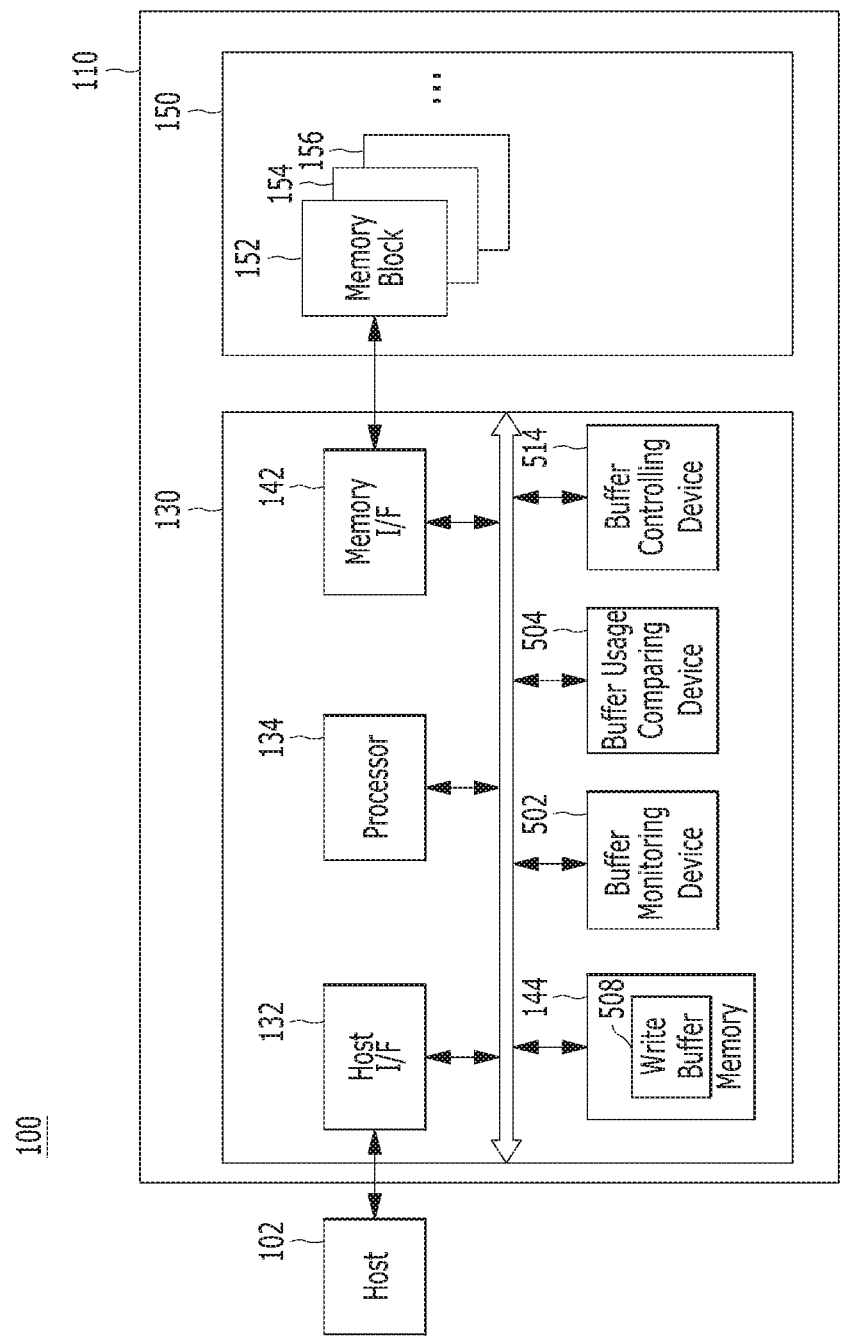
FIG. 1 is a block diagram illustrating a data processing system including a memory system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It is noted that reference to "an embodiment" does not necessarily mean only one embodiment, and different references to "an embodiment" are not necessarily to the same embodiment(s).

It will be understood that, although the terms "first" and/or "second" may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that describe the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, numbers, steps, operations, elements, components, and/or combinations thereof but do not preclude the presence or addition of one or more other features, numbers, steps, operations, elements, components, and/or combinations thereof.

The above-described exemplary embodiments are merely for the purpose of understanding the technical spirit of the present disclosure and the scope of the present disclosure should not be limited to the above-described exemplary embodiments. It will be obvious to those skilled in the art to which the present disclosure pertains that other modifications based on the technical spirit of the present disclosure may be made in addition to the above-described exemplary embodiments.

Unless otherwise defined, all terms including technical and scientific terms used herein have the same meaning as commonly understood by one of ordinary skill in the art to which the present disclosure belongs. Unless otherwise defined in the present disclosure, the terms should not be construed as being ideal or excessively formal.

Hereinafter, the various embodiments of the present invention will be described in detail with reference to the attached drawings.

FIG. 1 is a block diagram illustrating a data processing system 100 including a memory system 110 in accordance with an embodiment of the present invention.

Referring to FIG. 1, the data processing system 100 may include a host 102 and the memory system 110.

The host 102 may include any of a variety of portable electronic devices such as a mobile phone, a MP3 player and a laptop computer, or any of a variety of non-portable electronic devices such as a desktop computer, a game machine, a TV and a projector.

The host 102 may include at least one OS (operating system) or a plurality of operating systems. The host 102 may execute an OS to perform an operation corresponding to a user's request on the memory system 110. Here, the host 102 may provide a plurality of commands corresponding to a user's request to the memory system 110. Thus, the memory system 110 may perform certain operations corresponding to the plurality of commands which correspond to the user's request. The OS may manage and control overall functions and operations of the host 102. The OS may support an operation between the host 102 and a user using the data processing syste 100 or the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of the memory system 110 include a solid state drive (SSD), a multi-media card (MMC), and an embedded MMC (eMMC).

The memory system 110 may include various types of storage devices. Non-limiting examples of such storage devices include volatile memory devices such as a DRAM dynamic random access memory (DRAM) and a static RAM (SRAM), and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), and a flash memory.

The memory system 110 may include a memory device 150 and a controller 130.

The controller 130 and the memory device 150 may be integrated into a single semiconductor device, which may be included in any of the various types of memory systems as described above. For example, the controller 130 and the memory device 150 may be integrated as a single semiconductor device to constitute an SSD, a PCMCIA (personal computer memory card international association) card, SD card including a mini-SD, a micro-SD and a SDHC, and an UFS device. The memory system 110 may be configured as a part of a computer, a smart phone, a portable game player, or one of various components configuring a computing system.

The memory device 150 may be a nonvolatile memory device which may retain stored data even though power is not supplied. The memory device 150 may store data provided from the host 102 through a write operation, and output data stored therein to the host 102 through a read operation. In an embodiment, the memory device 150 may include a plurality of memory dies (not shown), and each memory die may include a plurality of planes (not shown). Each plane may include a plurality of memory blocks 152 to 156, each of which may include a plurality of pages, each of which may include a plurality of memory cells coupled to a word line. In an embodiment, the memory device 150 may be a flash memory having a 3-dimensional (3D) stack structure.

The structure of the memory device 150 and the 3D stack structure of the memory device 150 will be described in detail below with reference to FIGS. 2 to 4.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program, and erase operations of the memory device 150.

More specifically, the controller 130 may include a host interface (IF) 132, a processor 134, a memory interface 142, and a memory 144, all operatively coupled or engaged via an internal bus. Specifically, the memory controller 130 may include a host interface (I/F) 132, a processor 134, a memory interface (I/F) 142, and a memory 144. The memory controller 130 may further include a buffer monitoring device 502, a buffer usage comparing device 504 and a buffer controlling device 514, which will be described later with reference to FIG. 5, and the memory 144 may include a write buffer 508.

The host interface 132 may process a command and data of the host 102. The host interface 132 may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE). The host interface 132 may be driven via a firmware, that is, a host interface layer (HIL) for exchanging data with the host 102.

The memory interface 142 may serve as a memory/storage interface between the controller 130 and the memory device 150 such that the controller 130 may control the memory device 150 in response to a request from the host 102.

The memory 144 may serve as a working memory of the memory system 110 and the controller 130, and store data for driving the memory system 110 and the controller 130.

The memory 144 may be a volatile memory. For example, the memory 144 may be a static random access memory (SRAM) or dynamic random access memory (DRAM). The memory 144 may be disposed within or external to the controller 130. FIG. 1 shows the memory 144 disposed within the controller 130. In an embodiment, the memory 144 may be an external volatile memory having a memory interface for transferring data between the memory 144 and the controller 130.

As described above, the memory 144 may include a program memory, a data memory, a write buffer/cache, a read buffer/cache, a data buffer/cache, and a map buffer/cache to store some data required to perform data write and read operations between the host 102 and the memory device 150, and other data required for the controller 130 and the memory device 150 to perform these operations.

The processor 134 may control overall operations of the memory system 110. The processor 134 may use firmware to control the overall operations of the memory system 110. The firmware may be referred to as a flash translation layer (FTL). The processor 134 may be implemented with a microprocessor or a central processing unit (CPU).

For example, the controller 130 may perform an operation requested by the host 102 in the memory device 150 through the processor 134, which is implemented as a microprocessor, a CPU, or the like. Also, the controller 130 may perform a background operation on the memory device 150 through the processor 134, which may be realized as a microprocessor or a CPU. The background operation performed on the memory device 150 may include an operation of copying and processing data stored in some memory blocks among the memory blocks 152 to 156 of the memory device 150 into other memory blocks, e.g., a garbage collection (GC) operation, an operation of performing swapping between the memory blocks 152 to 156 or between the data of the memory blocks 152 to 156, e.g., a wear-leveling (WL) operation, an operation of storing the map data stored in the controller 130 in the memory blocks 152 to 156, e.g., a map flush operation, or an operation of managing bad blocks of the memory device 150, e.g., a bad block management operation of detecting and processing bad blocks among the memory blocks 152 to 156 in the memory device 150.

The memory device of the memory system in accordance with an embodiment of the present invention is described in detail with reference to FIGS. 2 to 4.

Figure 2:
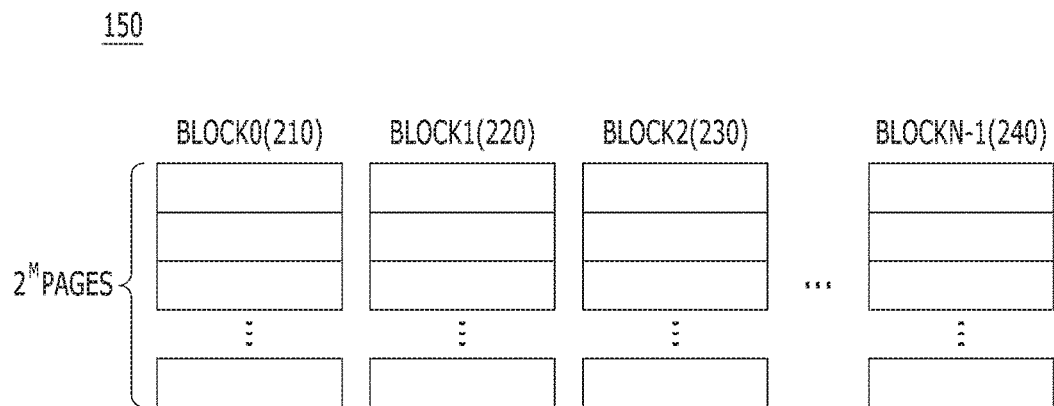
FIG. 2 is a diagram illustrating a memory device employed in the memory system shown in FIG. 1.

FIG. 2 is a schematic diagram illustrating the memory device 150. FIG. 3 is a circuit diagram illustrating an exemplary configuration of a memory cell array of a memory block 330 in the memory device 150. FIG. 4 is a schematic diagram illustrating an exemplary 3D structure of the memory device 150.

Referring to FIG. 2, the memory device 150 may include a plurality of memory blocks BLOCK0 to BLOCKN−1, where N is an integer greater than 1. Each of the blocks BLOCK0 to BLOCKN−1 may include a plurality of pages, for example, $2^M$ or M pages, the number of which may vary according to circuit design, M being an integer greater than 1. Each of the pages may include a plurality of memory cells that are coupled to a plurality of word lines WL.

Also, memory cells in the respective memory blocks BLOCK0 to BLOCKN−1 may be one or more of a single level cell (SLC) memory block storing 1-bit data or a multi-level cell (MLC) memory block storing 2-bit data. Hence, the memory device 150 may include SLC memory blocks or MLC memory blocks, depending on the number of bits which can be expressed or stored in each of the memory cells in the memory blocks. The SLC memory blocks may include a plurality of pages which are embodied by memory cells, each storing one-bit data. The SLC memory blocks may generally have higher data computing performance and higher durability than the MLC memory blocks. The MLC memory blocks may include a plurality of pages which are embodied by memory cells each storing multi-bit data (for example, 2 or more bits). The MLC memory blocks may generally have larger data storage space, that is, higher integration density, than the SLC memory blocks. In another embodiment, the memory device 150 may include a plurality of triple level cell (TLC) memory blocks. In yet another embodiment, the memory device 150 may include a plurality of quadruple level cell (QLC) memory blocks. The TLC memory blocks may include a plurality of pages which are embodied by memory cells each capable of storing 3-bit data. The QLC memory blocks may include a plurality of pages which are embodied by memory cells each capable of storing 4-bit data.

Instead of a nonvolatile memory, the memory device 150 may be implemented by any one of a phase change random access memory (PCRAM), a resistive random access memory (RRAM(ReRAM)), a ferroelectrics random access memory (FRAM), and a spin transfer torque magnetic random access memory (STT-RAM(STT-MRAM)).

The memory blocks 210, 220, 230, 240 may store the data transferred from the host 102 through a program operation, and may transfer data stored therein to the host 102 through a read operation.

Figure 3:
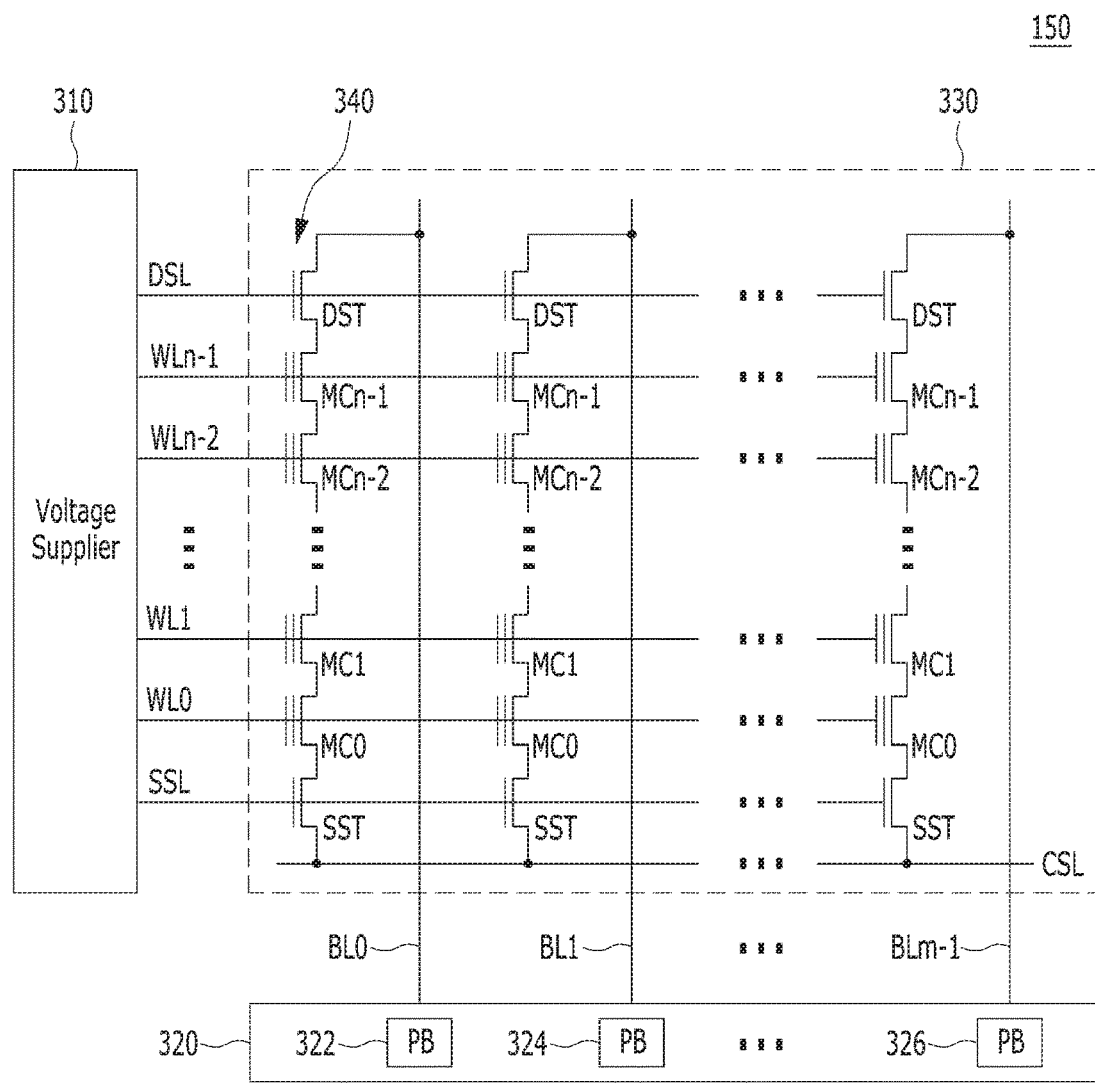
FIG. 3 is a circuit diagram illustrating a memory cell array of a memory block in the memory device shown in FIG. 1.
Figure 4:
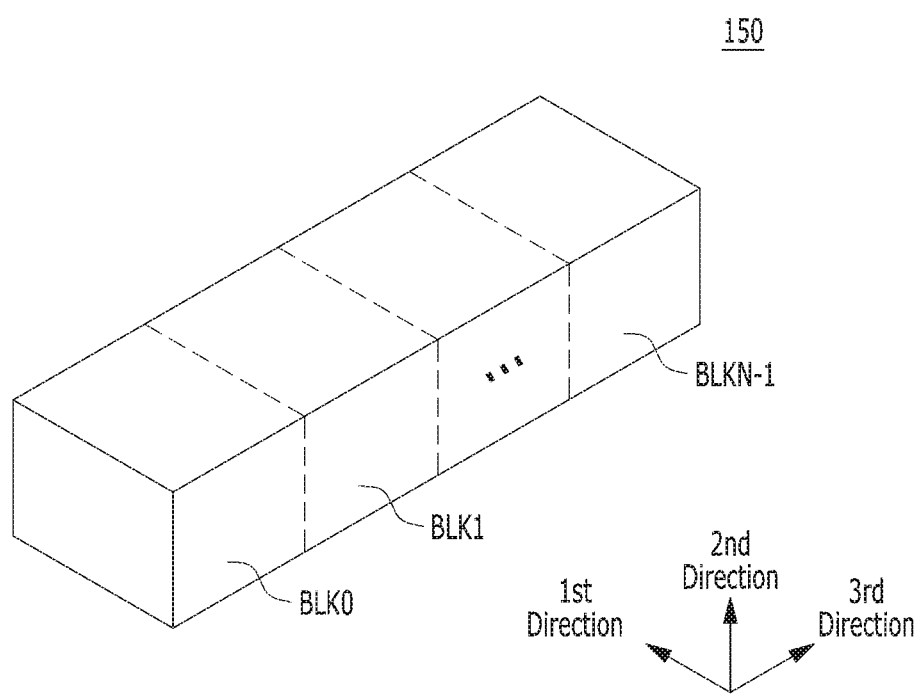
FIG. 4 is a block diagram illustrating a structure of a memory device of a memory system in accordance with an embodiment of the present invention.

Referring to FIG. 3, the memory block 330 may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the present disclosure is not limited thereto. It is noted that the memory cells may be NOR flash memory cells, or hybrid flash memory cells including two or more types of memory cells combined therein. Also, it is noted that the memory device 150 may be a flash memory device including a conductive floating gate such as a charge storage layer, or a charge trap flash (CTF) memory device including an insulation layer as a charge storage layer.

The memory device 150 may further include a voltage supply 310 which generates different word line voltages including a program voltage, a read voltage, and a pass voltage to supply to the word lines according to an operation mode. The voltage generation operation of the voltage supply 310 may be controlled by a control circuit (not illustrated). Under the control of the control circuit, the voltage supply 310 may select at least one of the memory blocks (or sectors) of the memory cell array, select at least one of the word lines of the selected memory block, and provide the word line voltages to the selected word line(s) and the unselected word lines as may be needed.

The memory device 150 may include a read/write circuit 320 which is controlled by the control circuit. During a verification/normal read operation, the read/write circuit 320 may operate as a sense amplifier for reading (sensing and amplifying) data from the memory cell array. During a program operation, the read/write circuit 320 may operate as a write driver for supplying a voltage or a current to bit lines according to data to be stored in the memory cell array. During a program operation, the read/write circuit 320 may receive data to be stored into the memory cell array from a buffer (not illustrated), and drive bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

The memory device 150 may be embodied by a 2D or 3D memory device. Particularly, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1. Herein, FIG. 4 is a block diagram illustrating the memory blocks 152, 154 and 156 of the memory device 150 shown in FIG. 1. Each of the memory blocks 152, 154 and 156 may be realized in a 3D structure (or vertical structure). For example, the memory blocks 152, 154 and 156 may include structures of a three-dimensional structure that are extended in first to third directions, e.g., an x-axis direction, a y-axis direction, and a z-axis direction.

Each memory block 330 included in the memory device 150 may include a plurality of NAND strings NS that are extended in the second direction, and a plurality of NAND strings NS that are extended in the first direction and the third direction. Herein, each of the NAND strings NS may be coupled to a bit line BL, at least one string selection line SSL, at least one ground selection line GSL, a plurality of word lines WL, at least one dummy word line DWL, and a common source line CSL, and each of the NAND strings NS may include a plurality of transistor structures TS.

In short, each memory block 330 among the memory blocks 152, 154 and 156 of the memory device 150 may be coupled to a plurality of bit lines BL, a plurality of string selection lines SSL, a plurality of ground selection lines GSL, a plurality of word lines WL, a plurality of dummy word lines DWL, and a plurality of common source lines CSL, and each memory block 330 may include a plurality of NAND strings NS. Also, in each memory block 330, one bit fine BL may be coupled to a plurality of NAND strings NS to realize a plurality of transistors in one NAND string NS. Also, a string selection transistor SST of each NAND string NS may be coupled to a corresponding bit line BL, and a ground selection transistor GST of each NAND string NS may be coupled to a common source line CSL. Herein, memory cells MC may be provided between the string selection transistor SST and the ground selection transistor GST of each NAND string NS. In other words, a plurality of memory cells may be realized in each memory block 330 of the memory blocks 152, 154 and 156 of the memory device 150.

When user data or host data is provided along with a program command CMDPGM from the host 102, the memory controller 130 may temporarily store the host data, in the memory 144 in the inside of the memory controller 130. The memory controller 130 may provide the memory device 150 with the temporarily stored host data only when the host data temporarily stored in the memory 144 forms a page unit, a multi-plane page unit, or a one-shot program unit (hereinafter, referred to as a program unit). When a program command CMDPGM is not additionally provided from the host 102, or only a program command CMDPGM for host data having the same logical block address is continuously provided, there may occur a victim situation in which the size of the host data temporarily stored in the memory 144 is kept constant. When the victim situation occurs while the host data temporarily stored in the memory 144 does not form the program unit yet, the host data temporarily stored in the memory 144 may not be able to form the program unit even though time passes. Therefore, the host data temporarily stored in the memory 144 may not be provided to the memory device 150 for a long time, rather the host data continues to remain in the memory 144, which is problematic.

According to conventional art, in order to solve the problem that the host data temporarily stored in the memory 144 does not form the program unit even though time passes while being in the victim situation, thus the host data is not programmed into the memory device but continues to remain in the memory 144, the memory controller may control the memory device to periodically perform an internal flush operation of programming the host data along with dummy data in the memory block so that the host data temporarily stored in the memory 144 and the dummy data may form the program unit. A memory controller according to conventional art may perform the internal flush operation without exception at every predetermined period, even though the program command $CMD_{PGM}$ is continuously provided to the host 102 so that the host data temporarily stored in the memory 144 can form a program unit with the host data corresponding to the program command $CMD_{PGM}$ that is continuously provided. Therefore, according to conventional art, there is a problem in that memory space is wasted because the dummy data is unnecessarily programmed into the memory block through the strict and periodic internal flush operation.

According to the embodiment of the present invention, the memory controller 130 may check the size of the host data provided from the host 102 to the memory 144 for a predetermined period of time, and when it is determined that the host data temporarily stored in the memory 144 is to form the program unit, the memory controller 130 may prevent the problem of unnecessarily programming the dummy data in the memory block by skipping the internal flush operation which is supposed to be periodically performed.

Figure 5:
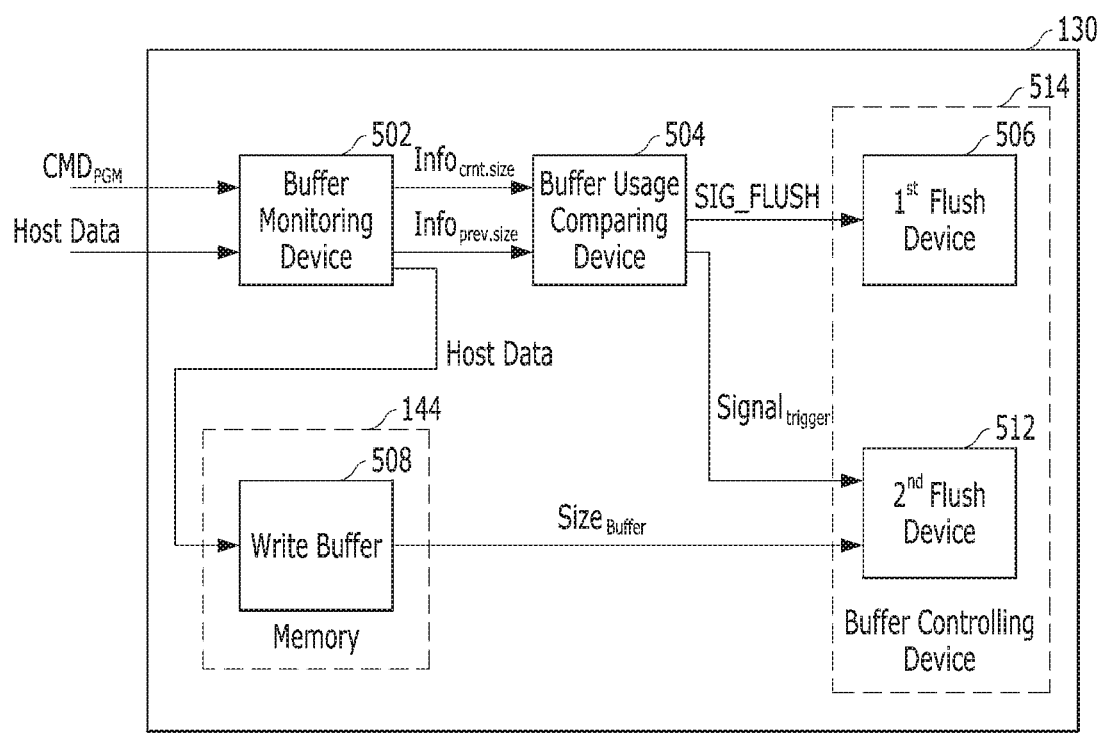
FIG. 5 is a block diagram illustrating a structure of a memory system in accordance with an embodiment of the present invention.

FIG. 5 is a block diagram illustrating a structure of the memory system 110 in accordance with an embodiment of the present invention. FIG. 5 schematically shows only the structure related to the present invention in the data processing system 100 of FIG. 1.

As described above, the host 102 may provide the memory system 110 with a plurality of commands, and the memory system 110 may perform diverse operations in response to the provided commands.

As illustrated in FIG. 5, the memory controller 130 may further include a buffer monitoring device 502, a buffer usage comparing device 504, and a buffer controlling device 514. The memory 144 may include a write buffer 508. The buffer controlling device 514 may include a first flush device 506 and a second flush device 512.

The buffer monitoring device 502 may receive a program command $CMD_{PGM}$ along with host data provided from the host 102. The program command $CMD_{PGM}$ may be a plurality of commands. The buffer monitoring device 502 may check the size of the host data provided from the host 102 for a predetermined period and store the host data size information in an internal storage space. The host data size information of a current period may be defined as current period data size information $Info_{crnt.size}$, and the host data size information of a previous period right ahead of the current period may be defined as previous period data size information $Info_{prev.size}$. The buffer monitoring device 502 may provide the buffer usage comparing device 504 with the current period data size information $Info_{crnt.size}$ and the previous period data size information $Info_{prev.size}$ at every predetermined period.

The write buffer 508 may temporarily store the host data provided from the host 102. As described earlier, the memory controller 130 may not program the host data provided from the host 102 into a memory block immediately but may temporarily store the host data in the write buffer 508, and control the memory device 150 to program the host data into the memory block when the temporarily stored host data forms a program unit. The write buffer 508 may be realized as a volatile memory.

The buffer usage comparing device 504 may compare the sizes indicated by the current period data size information $Info_{crnt.size}$ and the previous period data size information $Info_{prev.size}$. When the difference between the size indicated by the current period data size information $Info_{crnt.size}$ and the previous period data size information $Info_{prev.size}$ is less than a first threshold value, the buffer usage comparing device 504 may provide the first flush device 506 with a flush control signal SIG_FLUSH. When the difference between the size indicated by the current period data size information $Info_{crnt.size}$ and the previous period data size information $Info_{prev.size}$ is greater than or equal to the first threshold value, the buffer usage comparing device 504 may provide the second flush device 512 with a trigger signal $Signal_{trigger}$.

The buffer controlling device 514 may include the first flush device 506 for providing the memory device 150 with the host data temporarily stored in the write buffer 508 in response to the flush control signal SIG_FLUSH, and the second flush device 512 for providing, when the size of the host data temporarily stored in the memory 508 is greater than a second threshold value, the memory device 150 with the temporarily stored host data.

The first flush device 506 may control the memory device 150 to perform an internal flush operation based on the provided flush control signal SIG_FLUSH. The first flush device 506 may control the memory device 150 to perform the internal flush operation of programming dummy data and the host data, which form the program unit, into a memory block.

Figure 6:
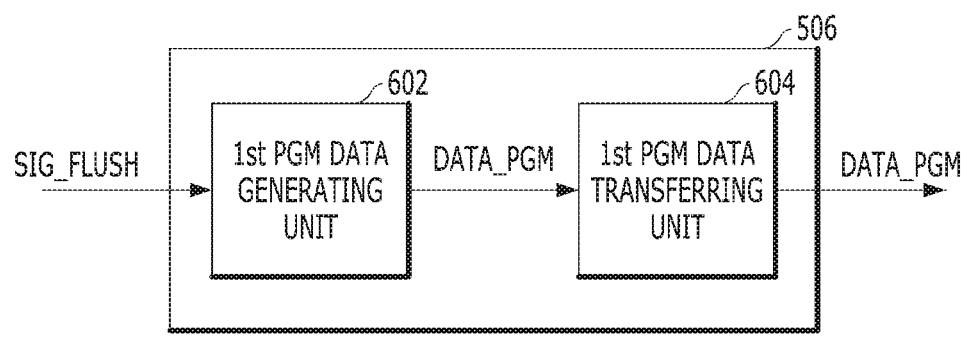
FIG. 6 is a block diagram illustrating a structure of a first flush device 506.

FIG. 6 is a block diagram illustrating a structure of the first flush device 506.

The first flush device 506 may include a first program data generating unit 602 and a first program data transferring unit 604.

The first program data generating unit 602 may combine the host data temporarily stored in the write buffer 508 with the dummy data to generate program-unit data DATA_PGM having the size of the program unit in response to the provided flush control signal SIG_FLUSH.

The first program data transferring unit 604 may provide the memory device 150 with the generated program-unit data DATA_PGM so that the memory device 150 may perform an internal flush operation of programming the program-unit data DATA_PGM.

According to the embodiment of the present invention, the first flush device 506 may prevent the memory device 150 from wasting memory space, which is caused by programming unnecessary dummy data, by performing the internal flush operation only when the difference between the sizes indicated by the current period data size information $Info_{crnt.size}$ and the previous period data size information $Info_{prev.size}$ is smaller than the first threshold value, that is, only when the host data temporarily stored in the write buffer 508 falls in the victim situation for a long time while having a size under the program unit and thus is not expected to form a program unit soon.

Referring back to FIG. 5, the second flush device 512 may determine whether the size of the host data temporarily stored in the write buffer 508 is greater than a second threshold value or not based on the provided trigger signal $Signal_{trigger}$. When the size of the host data temporarily stored in the write buffer 508 is greater than or equal to the second threshold value, the second flush device 512 may control the memory device 150 to perform a flush operation of programming host data as much as the size corresponding to the second threshold value among the host data temporarily stored in the write buffer 508 into a memory block. The size corresponding to the second threshold values may be bigger than the size of the program unit.

Figure 7:
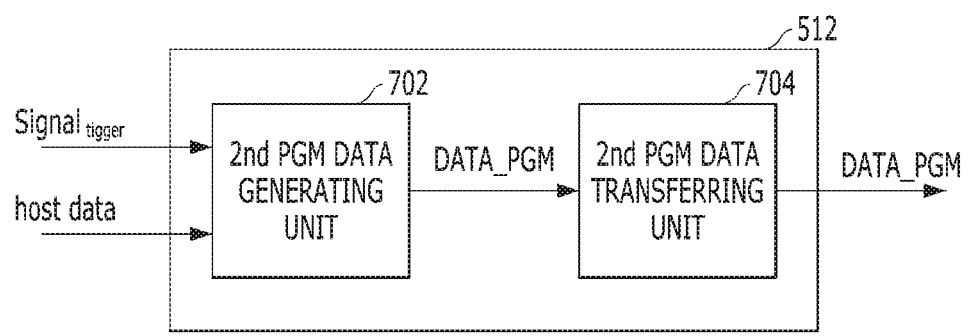
FIG. 7 is a block diagram illustrating a structure of a second flush device 512.

FIG. 7 is a block diagram illustrating a structure of the second flush device 512.

The second flush device 512 may include a second program data generating unit 702 and a second program data transferring unit 704.

The second program data generating unit 702 may determine whether the size of the host data temporarily stored in the write buffer 508 is greater than the second threshold value. The second program data generating unit 702 may generate program-unit data DATA_PGM by dividing the host data temporarily stored in the write buffer 508 by the size corresponding to the second threshold value according to the determination of whether the size of the host data temporarily stored in the write buffer 508 is greater than the second threshold value or not.

The second program data transferring unit 704 may provide the memory device 150 with the above-generated program-unit data DATA_PGM so that the memory device 150 performs a flush operation of programming the program-unit data DATA_PGM.

According to the embodiment of the present invention, when the difference between the sizes indicated by the current period data size information $Info_{crnt.size}$ and the previous period data size information $Info_{prev.size}$ is greater than or equal to the first threshold value, it is reasonable to regard that the host data that are temporarily stored in the write buffer 508 may form a program unit soon. Under this expectation, the internal flush operation of the current period may not need to be performed and thus may be skipped. The second flush device 512 may control the memory device 150 to perform the flush operation of programming the host data having the size of the program unit into the memory block regardless of whether the internal flush operation is performed or not when the size $Size_{Buffer}$ of the host data temporarily stored in the write buffer 508 is greater than the second threshold value.

Figure 8:
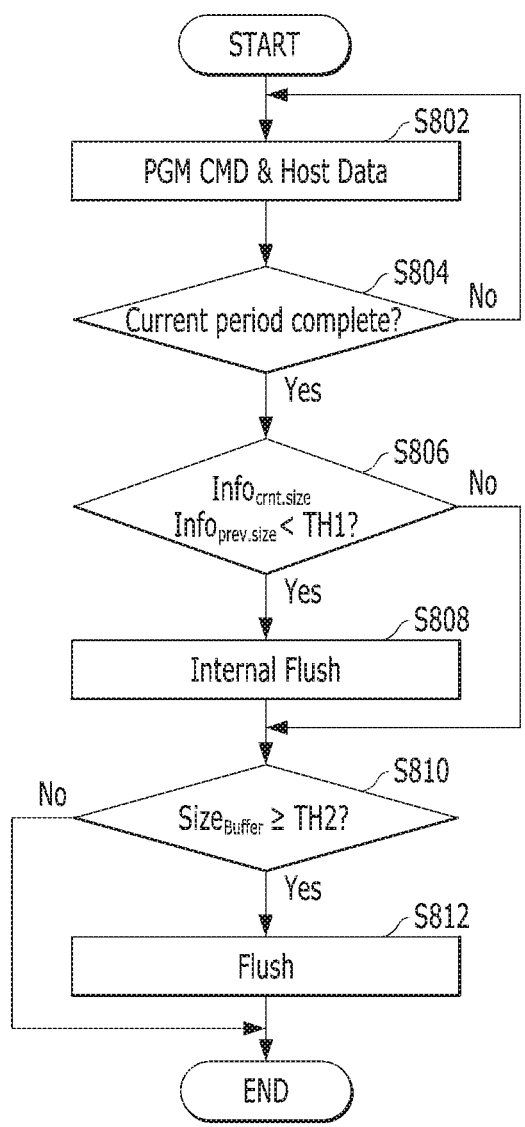
FIG. 8 is a flowchart describing an operation of a memory system in accordance with an embodiment of the present invention.

FIG. 8 is a flowchart describing an operation of the memory system 110 in accordance with an embodiment of the present invention. The operation of the memory system 110 in accordance with the exemplary embodiment of the present invention may be repeated at every period. FIG. 8 illustrates a process of operating the memory system 110 performed during one period for the sake of convenience in description.

In step S802, the buffer monitoring device 502 may receive host data along with the program command $CMD_{PGM}$ provided from the host 102, and the write buffer 508 may temporarily store the host data provided from the host 102.

In step S804, the buffer monitoring device 502 may determine whether the current period is completed or not. When the buffer monitoring device 502 is not completed ('No' in the step S804), the buffer monitoring device 502 may go back to the step S802 and continue to receive the host data from the host 102 until the current period is completed.

In the step S804, when the current period is completed ('Yes' in the step S804), the buffer monitoring device 502 may check the size of the host data provided from the host 102 during the current period, and store the current period data size information $Info_{crnt.size}$ into an internal storage space.

In step S804, the buffer monitoring device 502 may provide the buffer usage comparing device 504 with the current period data size information $Info_{crnt.size}$ and the previous period data size information $Info_{prev.size}$ for each predetermined period. The current period illustrated in FIG. 8 may be a single period of the whole process.

In step S806, the buffer usage comparing device 504 may compare the sizes indicated by the current period data size information $Info_{crnt.size}$ and the previous period data size information $Info_{prev.size}$ provided in the step S804.

When the difference between the sizes indicated by the current period data size information $Info_{crnt.size}$ and the previous period data size information $Info_{prev.size}$ is smaller than the first threshold value TH1 ('Yes' in the step S806), the buffer usage comparing device 504 may provide the first flush device 506 with a flush control signal SIG_FLUSH. When the difference between the sizes indicated by the current period data size information $Info_{crnt.size}$ and the previous period data size information $Info_{prev.size}$ is greater than or equal to the first threshold value TH1 ('No' in the step S806), the buffer usage comparing device 504 may provide the second flush device 512 with a trigger signal $Signal_{trigger}$.

In step S808, the first flush device 506 may control the memory device 150 to perform an internal flush operation according to the flush control signal SIG_FLUSH provided in the step S806. The first flush device 506 controls the memory device 150 to perform the internal flush operation of programming dummy data and the host data, which form the program unit, in a memory block.

In step S810, the second flush device 512 may determine whether the size $Size_{Buffer}$ of the host data temporarily stored in the write buffer 508 is greater than the second threshold TH2 or not based on the trigger signal $Signal_{trigger}$ provided in the step S806.

In step S812, when it is determined in the step S810 that the size $Size_{Buffer}$ of the host data temporarily stored in the write buffer 508 is greater than the second threshold value TH2 ('Yes' in the step S810), the second flush device 512 may control the memory device 150 to perform a flush operation of programming host data of the size corresponding to the second threshold value TH2 among the data temporarily stored in the write buffer 508 into a memory block.

When it is determined in the step S810 that the size $Size_{Buffer}$ of the host data temporarily stored in the write buffer 508 is smaller than the second threshold value TH2 ('No' in the step S810), the process may end.

The second flush device 512 may receive the host data provided from the host 102, regardless of whether the internal flush operation is performed or not, and when the size $Size_{Buffer}$ of the host data temporarily stored in the write buffer 508 is greater than the second threshold value TH2, it may control the memory device 150 to perform the flush operation of programming the host data forming a program unit into a memory block.

The memory system according to an embodiment of the present invention may not unconditionally perform an internal flush operation at every predetermined period, and the data processing system may perform the internal flush operation based on the size of the host data provided from the host 102 whenever the predetermined period comes. When the size of the host data provided from the host 102 is sufficient that the host data temporarily stored in the write buffer 508 is expected to form a program unit along with the host data provided from the host 102, it is possible to prevent the problem of performing a dummy program operation unnecessarily in a memory block by skipping the internal flush operation.

Hereafter, a data processing system and electronic devices to which the memory system 110 including the memory device 150 and the controller 130, which are described above by referring to FIGS. 1 to 8, in accordance with the embodiment of the present invention will be described in detail with reference to FIGS. 9 to 17.

Figure 9:
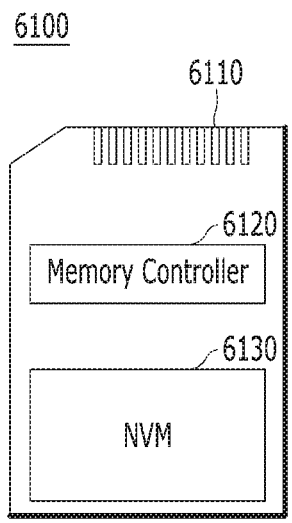
FIGS. 9 to 17 are diagrams illustrating exemplary applications of a data processing system in accordance with various embodiments of the present invention.

FIG. 9 is a diagram illustrating another example of a data processing system including a memory system in accordance with an embodiment. For example, FIG. 9 illustrates a memory card system 6100 to which the memory system may be applied.

Referring to FIG. 9, the memory card system 6100 may include a memory controller 6120, a memory device 6130 and a connector 6110.

More specifically, the memory controller 6120 may be electrically connected to, and configured to access, the memory device 6130 embodied by a nonvolatile memory (NVM). For example, the memory controller 6120 may be configured to control read, write, erase and background operations of the memory device 6130. The memory controller 6120 may be configured to provide an interface between the memory device 6130 and a host, and to use firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, the memory controller 6120 may include a random access memory (RAM), a processor, a host interface, a memory interface and an error correction component.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), advanced technology attachment (ATA), serial-ATA, parallel-ATA, small computer system interface (SCSI), enhanced small disk interface (EDSI), integrated drive electronics (IDE), Firewire, universal flash storage (UFS), wireless fidelity (Wi-Fi or WiFi) and Bluetooth. Thus, the memory system and the data processing system in accordance with the present embodiment may be applied to wired/wireless electronic devices or specific mobile electronic devices.

The memory device 6130 may be implemented by a nonvolatile memory (NVM). For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device to form a solid-state driver (SSD). Also, the memory controller 6120 and the memory device 6130 may be integrated to form a memory card such as a PC card (personal computer memory card international association (PCMCIA)), a compact flash (CF) card, a smart media card (e.g., a SM and a SMC), a memory stick, a multimedia card (e.g., a MMC, a RS-MMC, a MMCmicro and an eMMC), a secure digital (SD) card (e.g., a SD, a miniSD, a microSD and a SDHC), and/or a universal flash storage (UFS).

Figure 10:
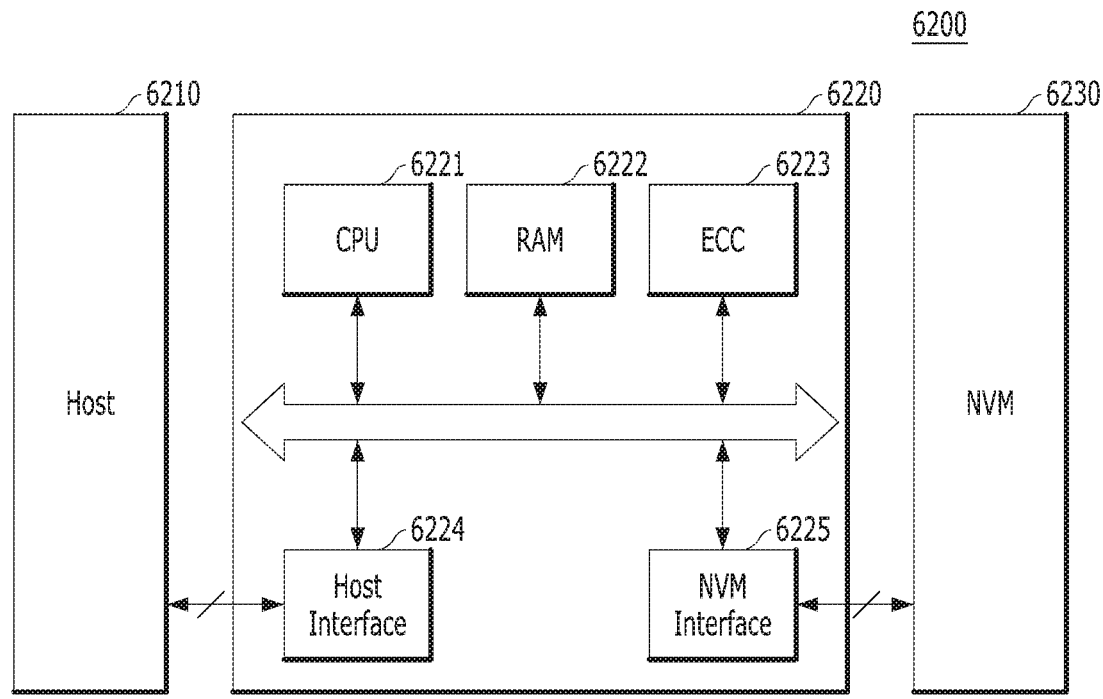

FIG. 10 is a diagram illustrating another example of a data processing system 6200 including a memory system in accordance with an embodiment.

Referring to FIG. 10, the data processing system 6200 may include a memory device 6230 having one or more nonvolatile memories (NVMs) and a memory controller 6220 for controlling the memory device 6230. The data processing system 6200 illustrated in FIG. 10 may serve as a storage medium such as a memory card (e.g., CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210. The memory controller 6220 may include one or more central processing units (CPUs) 6221, a buffer memory such as a random access memory (RAM) 6222, an error correction code (ECC) circuit 6223, a host interface 6224 and a memory interface such as a nonvolatile memory (NVM) interface 6225.

The CPU 6221 may control overall operations on the memory device 6230, for example, read, write, file system management, and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or vice versa. When the RAM 6222 is used as a cache memory, the RAM 6222 may assist the low-speed memory device 6230 to operate at high speed.

The ECC circuit 6223 may generate an error correction code (ECC) for correcting a failed bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. The ECC circuit 6223 may correct an error using the low density parity check (LDDC) code, Bose-Chaudhri-Hocquenghem (BCH) code, turbo code, Reed-Solomon (RS) code, convolution code, recursive systematic code (RSC) or coded modulation such as trellis coded modulation (TCM) or block coded modulation (BCM).

The memory controller 6220 may transmit/receive data to/from the host 6210 through the host interface 6224. The memory controller 6220 may transmit/receive data to/from the memory device 6230 through the NVM interface 6225. The host interface 6224 may be connected to the host 6210 through a parallel advanced technology attachment (PATH) bus, a serial advanced technology attachment (SATA) bus, a small computer system interface (SCSI), a universal serial bus (USB), a peripheral component interconnect-express (PCIe) or a NAND interface. The memory controller 6220 may have a wireless communication function with a mobile communication protocol such as wireless fidelity (WiFi) or long term evolution (LTE). The memory controller 6220 may be connected to an external device, for example, the host 6210 or another external device, and then transmit/receive data to/from the external device. In particular, as the memory controller 6220 is configured to communicate with the external device according to one or more of various communication protocols. The memory system and the data processing system in accordance with an embodiment may be applied to wired/wireless electronic devices, particularly a mobile electronic device.

Figure 11:
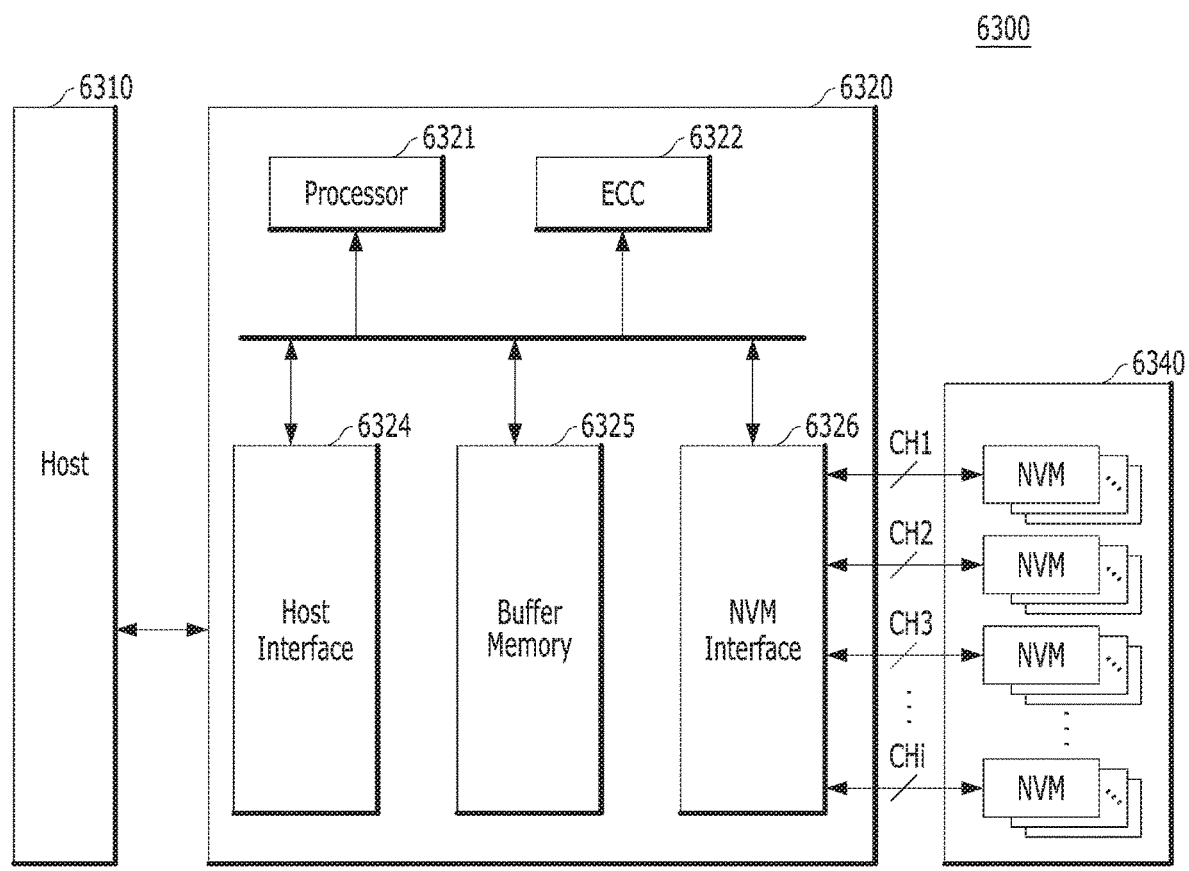

FIG. 11 is a diagram illustrating another example of a data processing system including a memory system in accordance with an embodiment. For example, FIG. 11 illustrates a solid state drive (SSD) 6300 to which the memory system may be applied.

Referring to FIG. 11, the SSD 6300 may include a controller 6320 and a memory device 6340 including a plurality of nonvolatile memories (NVMs). The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

The buffer memory 6325 may temporarily store data provided from the host 6310 or data provided from a plurality of flash memories NVM included in the memory device 6340. Further, the buffer memory 6325 may temporarily store meta data of the plurality of flash memories NVM, for example, map data including a mapping table. The buffer memory 6325 may be embodied by any of a variety of volatile memories such as a dynamic random access memory (DRAM), a synchronous DRAM (SDRAM), a double data rate (DDR) SDRAM, a low power DDR (LPDDR) SDRAM and a graphics RAM (GRAM) or nonvolatile memories such as a ferroelectric RAM (FRAM), a resistive RAM (RRAM or ReRAM), a spin-transfer torque magnetic RAM (STT-MRAM) and a phase-change RAM (PRAM). FIG. 11 illustrates that the buffer memory 6325 is embodied in the controller 6320. However, the buffer memory 6325 may be external to the controller 6320.

The ECC circuit 6322 may calculate an error correction code (ECC) value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 may be applied may be provided to embody a data processing system, for example, a redundant array of independent disks (RAID) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 12:
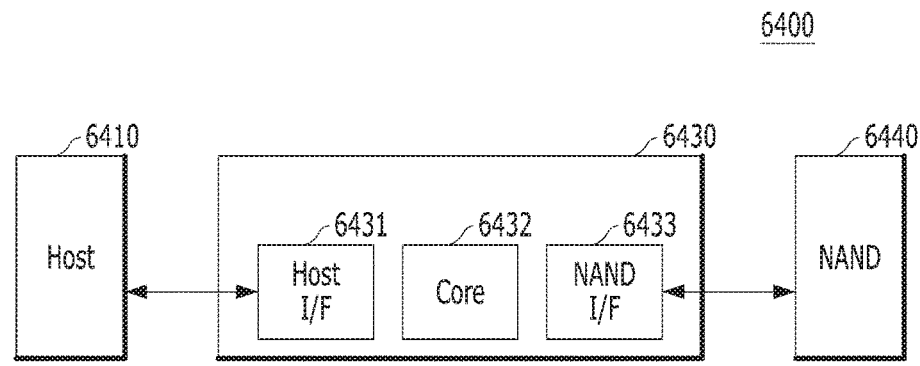

FIG. 12 is a diagram illustrating another example of a data processing system including a memory system in accordance with an embodiment. For example, FIG. 12 illustrates an embedded multi-media card (eMMC) 6400 to which the memory system may be applied.

Referring to FIG. 1.2, the eMMC 6400 may include a controller 6430 and a memory device 6440 embodied by one or more NAND flash memories. The controller 6430 may correspond to the controller 130 in the memory system 110 of FIG. 1. The memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, ultrahigh speed (UHS)-I/UHS-II) interface.

FIGS. 13 to 16 are diagrams illustrating other examples of a data processing system including a memory system in accordance with embodiments. For example, FIGS. 13 to 16 illustrate universal flash storage (UFS) systems to which the memory system may be applied.

Referring to FIGS. 13 to 16, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices, particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIG. 1. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 10 to 12, and the UFS cards 6530, 6630, 6730, 6830 may be embodied in the form of the memory card system 6100 described with reference to FIG. 9.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI unified protocol (UniPro) in mobile industry processor interface (MIPI). Furthermore, the UFS devices 6520, 6620, 6720, 6820 and the UFS cards 6530, 6630, 6730, 6830 may communicate with each other through any of various protocols other than the UFS protocol, for example, universal storage bus (USB) Flash Drives (UFDs), a multi-media card (MMC), a secure digital (SD), a mini-SD, and a micro-SD.

Figure 13:
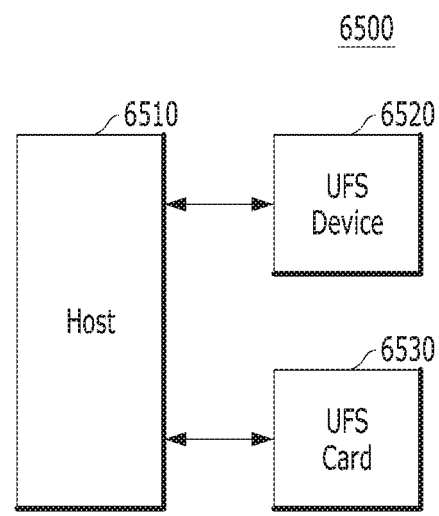

In the UFS system 6500 illustrated in FIG. 13, each of the host 6510, the UFS device 6520 and the UFS card 6530 may include UniPro. The host 6510 may perform a switching operation to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the illustrated embodiment, one UFS device 6520 and one UFS card 6530 are connected to the host 6510. However, a plurality of UFS devices and UFS cards may be connected in parallel or in the form of a star to the host 6410. A star formation is an arrangement in which a single device is coupled with plural devices for centralized operation. A plurality of UFS cards may be connected in parallel or in the form of a star to the UFS device 6520 or connected in series or in the form of a chain to the UFS device 6520.

Figure 14:
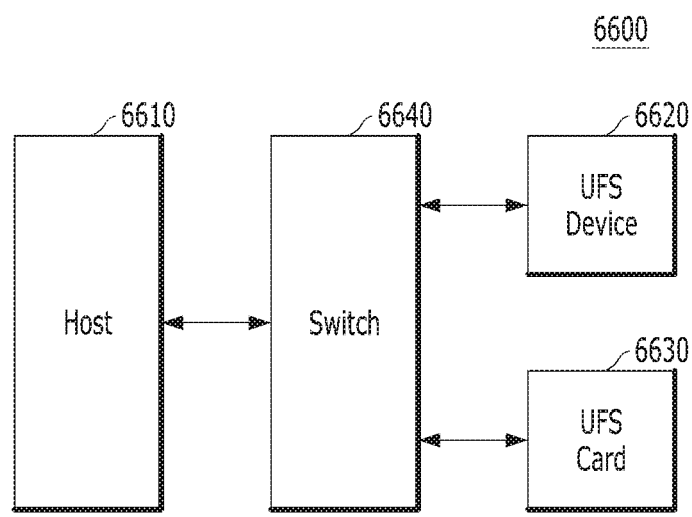

In the UFS system 6600 illustrated in FIG. 14, each of the host 6610, the UFS device 6620 and the UFS card 6630 may include UniPro. The host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the illustrated embodiment, one UFS device 6620 and one UFS card 6630 are connected to the switching module 6640. However, a plurality of UFS devices and UFS cards may be connected in parallel or in the form of a star to the switching module 6640. A plurality of UFS cards may be connected in series or in the form of a chain to the UFS device 6620.

Figure 15:
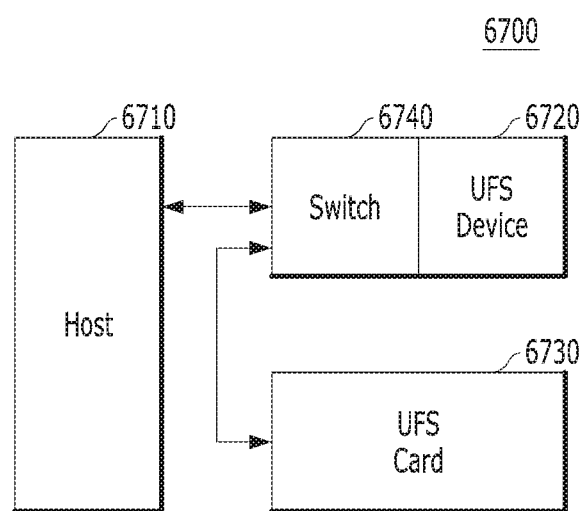

In the UFS system 6700 illustrated in FIG. 15, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro. The switching module 6740 may be integrated as one module with the UFS device 6720 inside or outside the UFS device 6720. In the illustrated embodiment, one UFS device 6720 and one UFS card 6730 are connected to the switching module 6740. However, a plurality of modules, each including the switching module 6740 and the UFS device 6720, may be connected in parallel or in the form of a star to the host 6710. In another example, a plurality of modules may be connected in series or in the form of a chain to each other. Furthermore, a plurality of UFS cards may be connected in parallel or in the form of a star to the UFS device 6720.

Figure 16:
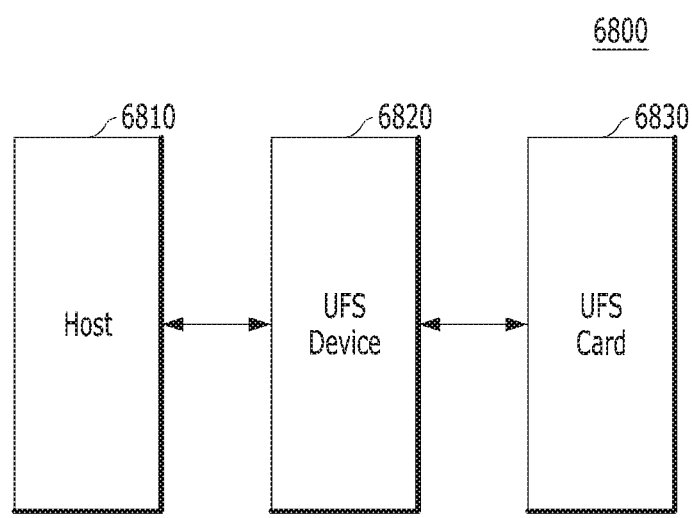

In the UFS system 6800 illustrated in FIG. 16, each of the host 6810, the UFS device 6820 and the UFS card 6830 may include M-PHY and UniPro. The UFS device 6820 may perform a switching operation to communicate with the host 6810 and the UFS card 6830. In particular, the UFS device 6820 may communicate with the host 6810 or the UFS card 6830 through a switching operation between the M-PHY and UniPro module for communication with the host 6810, and the M-PHY and UniPro module for communication with the UFS card 6830, for example, through a target identifier (ID) switching operation. The host 6810 and the UFS card 6830 may communicate with each other through target ID switching between the M-PHY and UniPro modules of the UFS device 6820. In the illustrated embodiment, one UFS device 6820 is connected to the host 6810 and one UFS card 6830 is connected to the UFS device 6820. However, a plurality of UFS devices may be connected in parallel or in the form of a star to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 17:
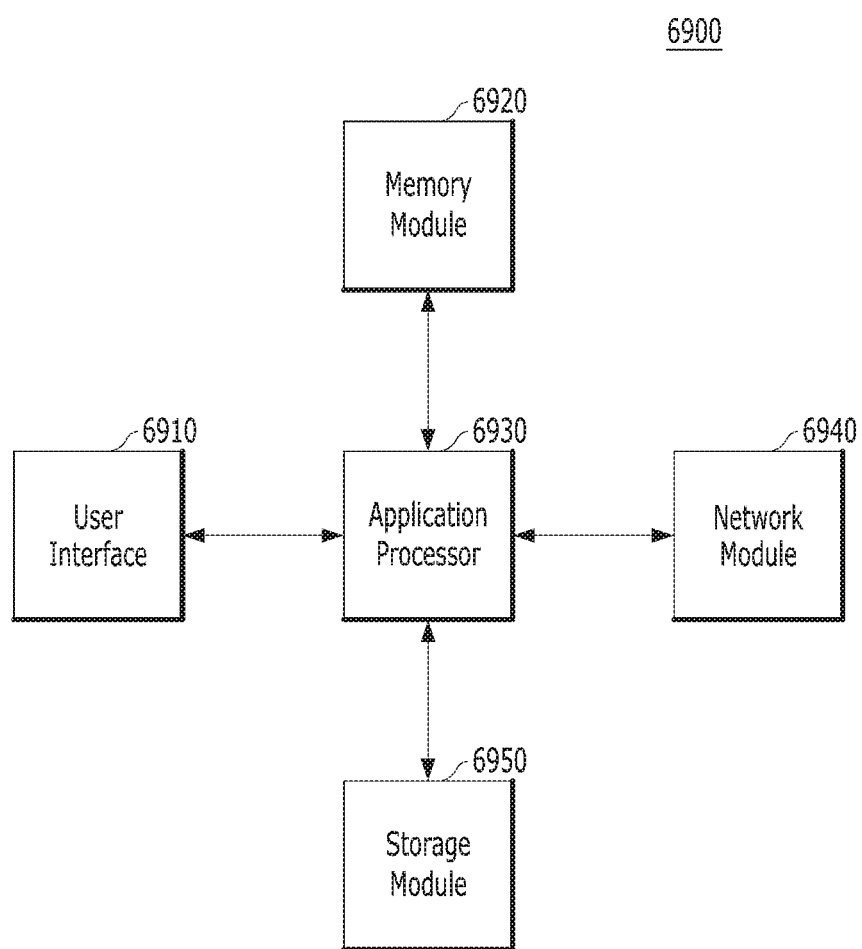

FIG. 17 is a diagram illustrating another example of a data processing system including a memory system in accordance with an embodiment of the present invention. For example, FIG. 17 is a diagram illustrating a user system 6900 to which the memory system may be applied.

Referring to FIG. 17, the user system 6900 may include a user interface 6910, a memory module 6920, an application processor 6930, a network module 6940 and a storage module 6950.

More specifically, the application processor 6930 may drive components in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory, or cache memory of the user system 6900. The memory module 6920 may include a volatile random access memory (RAM) such as a dynamic RAM (DRAM), a synchronous DRAM (SDRAM), a double data rate (DDR) SDRAM, a DDR2 SDRAM, a DDR3 SDRAM, a low power DDR (LPDDR) SDARM, a LPDDR3 SDRAM or a LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on package on package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, an eMMC and an UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired wireless communication with an external device. The user interface 6910 may display data processed by the processor 6930 on a display/touch module of the mobile electronic device, or support a function of receiving data from the touch panel.

According to the embodiments of the present invention, the memory system may prevent the problem of unnecessarily programming dummy data in a memory block by determining whether to perform a flush operation or not based on the size of user data provided for a predetermined period.

While the present invention has been described with respect to the specific embodiments, it will be apparent to those skilled in the art that various changes and modifications may be made without departing from the spirit and scope of the invention as defined in the following claims.

What is claimed is:

1. A memory system, comprising:
  a memory device suitable for storing host data provided from a host; and
  a memory controller suitable for managing and transferring the host data between the host and the memory device,
  wherein the memory controller comprises:
    a write buffer suitable for temporarily storing the host data to be transferred to the memory device;
    a buffer monitoring device suitable for checking a usage amount of the write buffer during a predetermined period;
    a buffer usage comparing device suitable for generating a flush control signal by comparing the usage amount checked during a current period corresponding to the predetermined period with the usage amount checked during a previous period corresponding to the predetermined period; and
    a first flush device suitable for transferring the host data temporarily stored in the write buffer to the memory device in response to the flush control signal,
    wherein the buffer usage comparing device generates the flush control signal when the usage amount checked during the current period is increased less than a first threshold value from the usage amount checked during the previous period.

2. The memory system of claim 1, further comprising a second flush device suitable for transferring the temporarily stored host data to the memory device when the usage amount of the write buffer is greater than a second threshold value.

3. The memory system of claim 2,
  wherein the second flush device includes:
    a second program data generating unit suitable for generating a program-unit data by dividing the host data temporarily stored in the write buffer by a size corresponding to the second threshold value; and
    a second program data transferring unit suitable for transferring the program-unit data to the memory device, and
  wherein the program-unit data has a size suitable for being flushed into the memory device by a single flush operation.

4. The memory system of claim 1,
  wherein the first flush device includes:
    a first program data generating unit suitable for generating a program-unit data by combining the temporarily stored host data with dummy data; and
    a first program data transferring unit suitable for transferring the program-unit data to the memory device, and
  wherein the program-unit data has a size suitable for being flushed into the memory device by a single flush operation.

5. The memory system of claim 4, wherein the size of the program-unit data is a page.

6. The memory system of claim 4, wherein the size of the program-unit data is a multi-plane page.

7. The memory system of claim 4, wherein the size of the program-unit data is a one-shot program unit.

8. The memory system of claim 1, wherein the memory controller further comprises a volatile memory that includes the write buffer.

9. The memory system of claim 1, wherein the buffer monitoring device includes an internal storage device suitable for storing a usage amount of the write buffer for each predetermined period.

10. A method for operating a memory system, the method comprising:
  buffering host data provided from a host in a write buffer;
  checking a usage amount of the write buffer during a predetermined period;
  generating a flush control signal by comparing the usage amount checked during a current period corresponding to the predetermined period with the usage amount checked during a previous period corresponding to the predetermined period; and
  performing a first flush operation of transferring the host data temporarily stored in the write buffer to a memory device in response to the flush control signal,
  wherein the flush control signal is not generated when the usage amount checked during the current period is increased by a first threshold value or more from the usage amount checked during the previous period, and the flush control signal is generated when the usage amount checked during the current period is increased less than the first threshold value from the usage amount checked during the previous period.

11. The method of claim 10, further comprising performing a second flush operation of transferring the temporarily stored host data to the memory device when the usage amount of the write buffer is greater than a second threshold value.

12. The method of claim 11,
  wherein the performing of the second flush operation includes:
    generating a program-unit data by dividing the host data temporarily stored in the write buffer by a size corresponding to the second threshold value; and
    transferring the program-unit data to the memory device, and
  wherein the program-unit data has a size suitable for being flushed into the memory device by a single flush operation.

13. The method of claim 10, wherein the performing of the first flush operation includes:

generating the program unit data by combining dummy data with the temporarily stored host data; and transferring the program-unit data to the memory device, and wherein the program-unit data has a size suitable for being flushed into the memory device by a single flush operation.

14. The method of claim 13, wherein the size of the program-unit data is a page.

15. The method of claim 13, wherein the size of the program-unit data is a multi-plane page.

16. The method of claim 13, wherein the size of the program-unit data is a one-shot program unit.

17. The method of claim 10, wherein the checking includes storing the usage amount of the write buffer for each predetermined period.

18. A memory system comprising:

a memory device;

a buffer suitable for buffering external data; and a controller suitable for controlling the memory device to periodically perform an internal flush operation of flushing the buffered data therein, wherein the controller further controls the memory device to skip the internal flush operation of a current period when a usage amount checked during the current period is increased by a threshold or more from a usage amount checked during a previous period, and perform the internal flush operation of the current period when the usage amount checked during the current period is increased less the threshold from the usage amount checked during the previous period.

* * * * *